United States Patent [19]

Wilson

[11] 3,991,804
[45] Nov. 16, 1976

[54] THERMAL PRESSURE RELIEF APPARATUS FOR TIRE AND RIM ASSEMBLY

[75] Inventor: Martin E. Wilson, Troy, Ohio

[73] Assignee: The B. F. Goodrich Company, Akron, Ohio

[22] Filed: May 2, 1975

[21] Appl. No.: 573,939

[52] U.S. Cl. .................................. 152/427; 137/74
[51] Int. Cl.² .................... B60C 29/00; F16K 17/38
[58] Field of Search ............ 152/415, 427; 301/5 R; 137/72, 74

[56] References Cited
UNITED STATES PATENTS

| | | | |
|---|---|---|---|
| 3,157,219 | 11/1964 | Dimin et al. | 152/427 |
| 3,201,174 | 8/1965 | Stanton | 301/5 R |
| 3,517,683 | 6/1970 | Chandler | 137/74 |
| 3,559,668 | 2/1971 | Crossman | 301/5 R |
| 3,734,158 | 5/1973 | Bennett et al. | 152/427 |

Primary Examiner—Drayton E. Hoffman
Attorney, Agent, or Firm—William A. Shira, Jr.; Frederick K. Lacher

[57] ABSTRACT

A thermal pressure relief apparatus in which an air release tube is connected to the air chamber within a tire rim assembly and extends along the outer surface of the rim. The tube is closed with a plug of eutectic material located in the tube at a critical position along the rim for release of the air from the tire when the temperature in the critical area exceeds a predetermined level. Installation and removal of the apparatus may be carried out without dismounting the tire. The passage used for communicating air from the air chamber to the air release tube may also be connected to an inflation valve for inflating the tire.

9 Claims, 3 Drawing Figures

THERMAL PRESSURE RELIEF APPARATUS FOR TIRE AND RIM ASSEMBLY

BACKGROUND OF THE INVENTION

This invention relates to tire and rim assemblies for aircraft and especially to safety devices for preventing sudden failure or explosion of the tire due to high temperatures. Usually these high temperatures are generated during braking and especially during a rejected take-off situation where the maximum braking is required. The high temperatures cause dangerously high pressures to develop in the tire and if this pressure is not released the tire will burst endangering personnel in the area and damaging parts of the aircraft adjacent the tire.

Heretofore holes have been drilled in the wheel rim and plugs of eutectic material screwed in the holes. When the temperature of the rim at the plugs reached a predetermined level, the eutectic material would melt and release the air pressure. The placement of plugs in the rim has been limited to those areas not covered by the bead of the tire. Usually the best location on the rim for the plugs of eutectic material is where the temperatures are the highest; however, these parts of the rim are often covered by the tire and it is therefore not possible to obtain the safety desired. Another problem is that the wall of the wheel rims must be of a minimum thickness to retain the plugs and the wall of a rim may have to be made thicker and heavier where the plugs are located. To balance the wheel, this area of greater thickness must then extend completely around the rim and therefore further increase the weight and cost of the rim. The additional weight is also undesirable for aircraft where every additional pound represents a pound reduction in pay load and extra power requirements.

In many aircraft brake installations used heretofore the plugs of eutectic material have been located in positions where it is necessary to remove the wheel in order to replace the plugs. This is time consuming and costly in aircraft operations where the time element is so critical.

SUMMARY OF THE INVENTION

According to this invention a thermal pressure relief apparatus is provided in which a plug of eutectic material is located in an axially extending pressure relief tube adjacent the radially inner surface of the rim and in communication with the chamber within the tire-rim assembly. The eutectic material can be located within the relief tube at the area of the rim where the highest temperatures are generated regardless of the position of the tire bead. Also the thickness of the rim need not be increased to provide for seating of plugs of eutectic material. In addition, air under pressure to inflate the tube may be injected through the passage leading to the pressure relief tube. With the construction of this invention replacement of the relief tube may be accomplished after release of the plug of eutectic material without removal of the wheel.

The accompanying drawings show one preferred form of thermal pressure relief apparatus made in accordance with and embodying this invention and which is representative of how this invention may be practiced.

DETAILED DESCRIPTION

Figure 1:
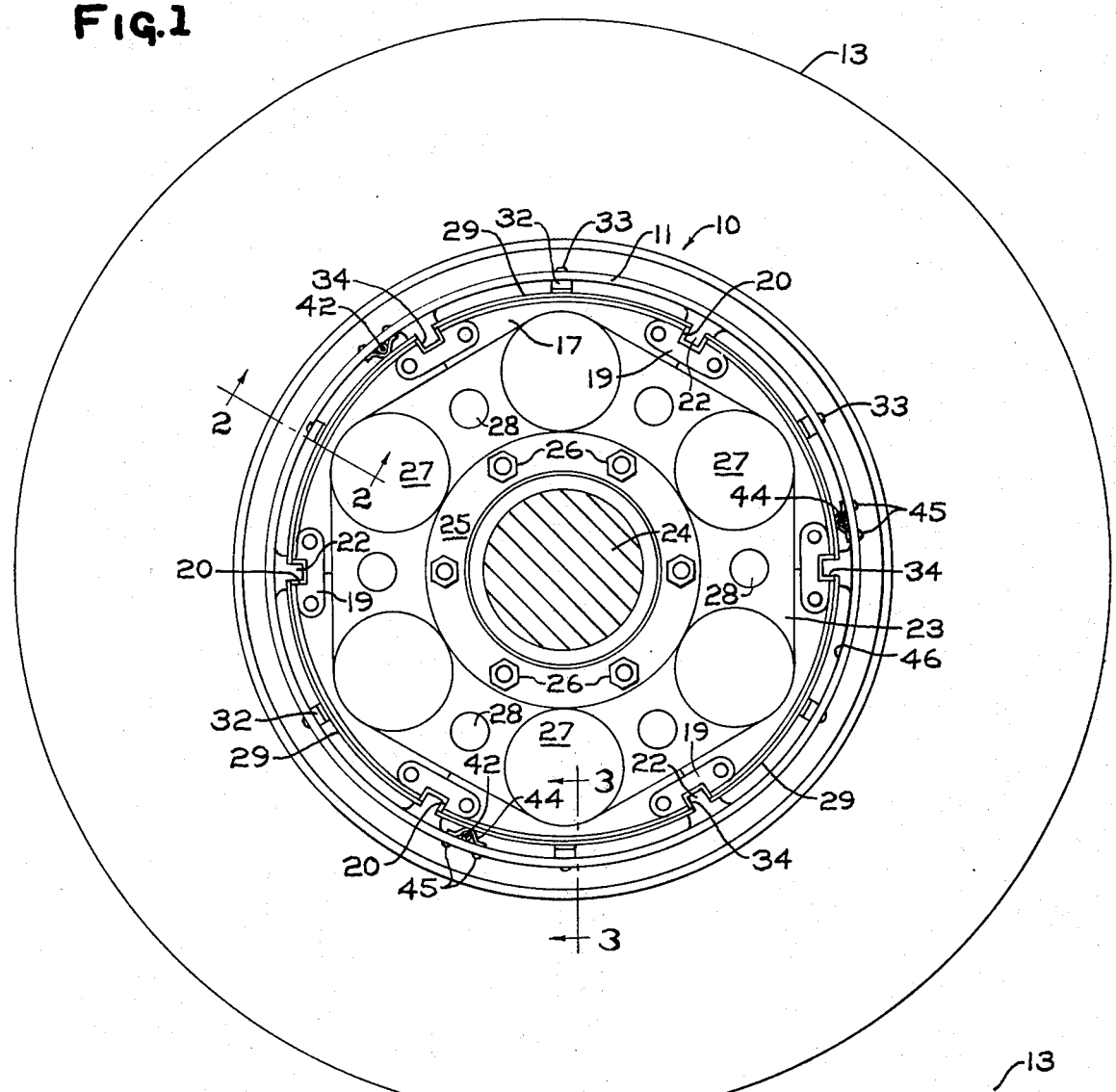
FIG. 1 is an axial elevational view of a tire and rim assembly showing the wheel and brake from the axle mounting side.
Figure 2:
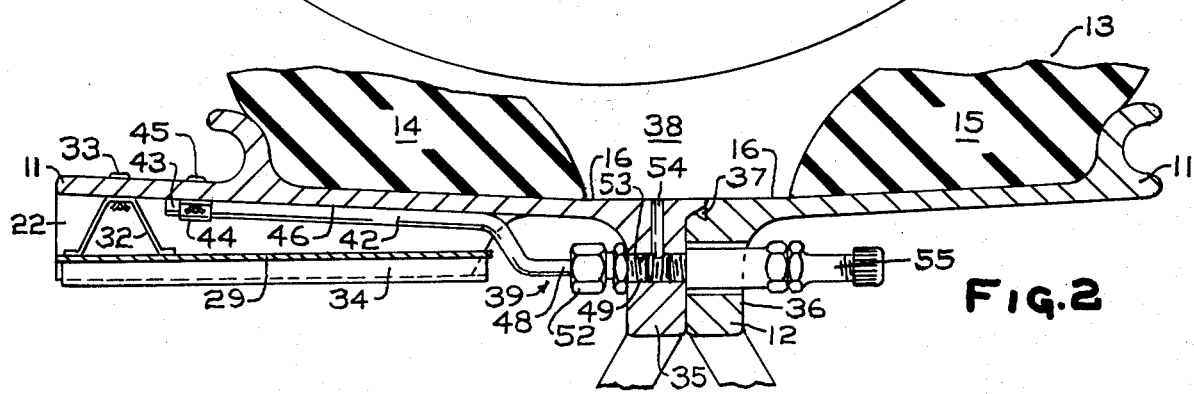
FIG. 2 is an enlarged fragmentary sectional view taken along the plane of line 2—2 of FIG. 1 showing the pressure release tube at one location on the rim.
Figure 3:
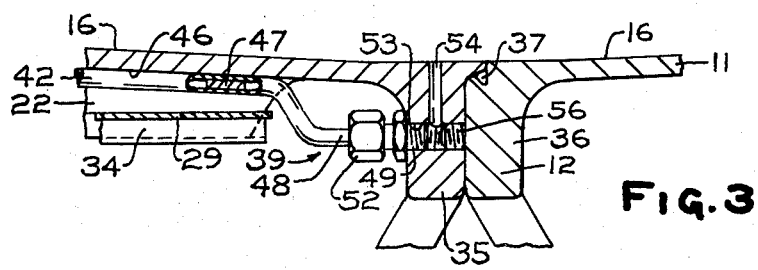
FIG. 3 is a sectional view similar to FIG. 2 taken along the plane of line 3—3 of FIG. 1 showing the pressure release tube at another position on the rim.

Referring to FIG. 1, a wheel and brake assembly 10 is shown in which a rim 11 of a wheel 12, shown partially in FIGS. 2 and 3, supports a tire 13. As shown in FIG. 2, the tire 13 has beads 14 and 15 mounted on a radially outer surface 16 of the rim 11.

The wheel and brake assembly 10 is of a type used for aircraft and may have rotor discs 17 with connecting torque-transmitting links 19 having slots 20 for slidable engagement with axially extending lugs 22 mounted on the rim 11. Stator discs (not shown) are mounted on spline members of a torque tube which may be part of a torque frame 23. A nonrotatable axle 24 has a torque flange 25 to which the torque frame 23 is bolted by six bolts 26. The torque frame 23 carries hydraulic piston and cylinder assemblies 27 and retraction spring assemblies 28 for actuation and adjustment of the brakes.

Heat shields 29 are interposed between the rim 11 and the brake stator and rotor discs 17 to reduce the heat transfer from the brake to the rim. Brackets 32 on the heat shield 29 are fastened to the rim 11 by rivets 33 and the edges of the heat shields are held in position against the lugs 22 by metal keyways or channels 34 mounted over the surface of the lugs 22.

The wheel 12 is split into annular sections 35 and 36 to permit mounting of the tire 13 on the rim 11, as shown in FIG. 2. A seal 37 is interposed between the sections 35 and 36 and compressed by bolting the sections together providing a sealed air pressure chamber 38 within the tire 13 and radially outer surface 16 of the rim 11.

A tire rim thermal relief assembly 39 is shown in more detail in FIGS. 2 and 3 and includes an air pressure release tube 42 extending between the heat shields 29 and rim 11 in a direction generally axially of the rim. A free end 43 of the tube 42 is clamped to the rim 11 by a bracket 44 and rivets 45. Preferably the tube 42 extends along a radially inner surface 46 of the rim 11 and a plug 47 of eutectic material, as shown in FIG. 3, is placed in the tube 42 in sealing engagement at a predetermined position along the length of the tube in a critical area where the temperatures generated during braking are the highest.

A connected end 48 of the tube 42 is releasably clamped to a threaded bushing 49 in the wheel section 35 by a threaded coupling sleeve 52. The bushing 49 is threaded in an opening 53 leading to a passage 54 in communication with the air pressure chamber 38 within the tire 13.

As shown in FIG. 2, a valve 55 for inflating and deflating the tire may also be threaded in the opening 53 at one position on the wheel 12. In the embodiment shown, three air pressure relief tubes 42 are located at equally spaced-apart positions circumferentially of the rim so that when the wheel 12 is stopped, one of the tubes will be close to the top of the wheel where the highest temperatures are reached. As shown in FIG. 3, the other two air pressure relief tubes are connected to the wheel section 35 at an opening 53 leading to a passage 54; however, the other end of the opening is sealed with a threaded plug 56 or the opening may stop short of going through the wheel section eliminating the need for the plug.

With this construction, the plug 47 of eutectic material can be located at any position along the air pressure relief tube 42 depending upon where the critical area is. This area may be different for different size tires and different types of brakes. During operation, if the temperature is increased to a dangerous level as by emergency braking, the plugs 47 of eutectic material will melt and the air in air pressure chamber 38 will be communicated through the passage 54 and the tube 42 to release the pressure in the chamber 38 and thereby prevent explosion of the tire 13. After the air has been released through the melting of the plug 47, the tube 42 may be removed by unscrewing the coupling sleeve 52 from the bushing 49 and removing the rivets 45 and brackets 44. If necessary, the heat shield 29 may also be removed by removing the rivets 33 and sliding the heat shield axially away from the wheel. A replacement relief tube 42 may then be substituted for the tube removed by screwing the coupling sleeve 52 on the bushing 49 and riveting the bracket 44 to the rim 11 with rivets 45. This can all be done without removal of the wheel 12 or dismounting of the tire 13.

It is understood that more or less than three relief tubes 42 may be used on each wheel 12 to provide the necessary protection. Furthermore, the plug 47 of eutectic material may be placed in different positions for different tubes 42 to tailor the thermal relief assemblies to the characteristics of the wheel and brake assembly 10.

I claim:

1. In a tire rim assembly in which said rim has a radially inner surface, a radially outer surface on which said tire is mounted and an air pressure chamber within said tire, the combination with said tire rim assembly of an air pressure relief tube in communication with said air pressure chamber, a length of said tube extending along said radially inner surface of said rim for exposure to rim temperatures along said length of said tube, a plug of eutectic material inserted in said tube to a predetermined position along said length of said tube whereby said plug may be located where the temperatures generated during braking are the highest to maintain pressure in said air pressure chamber under normal temperatures and to melt said plug and release said air pressure at temperatures above the melting point of said eutectic material.

2. The combination of claim 1 wherein said rim contains a passage in communication with said air pressure chamber and said air pressure relief tube is connected to said rim and is in communication with said passage.

3. The combination of claim 2 further comprising an air inlet valve connected to said rim and in communication with said passage for inflating the tire.

4. The combination of claim 1 wherein said air pressure relief tube extends in a direction generally axially of said rim for exposure to rim temperatures along the axial extent of said relief tube and said plug of eutectic material is located at said predetermined position axially of said rim along said length of said relief tube.

5. The combination of claim 2 wherein said air pressure relief tube has a free end and a connected end, said free end being releasably fastened to said rim at a position along the radially inner surface of said rim, said connected end being releasably connected to said rim adjacent said passage for communication of air between said passage and said tube and said plug of eutectic material being positioned in said tube between said free end and said connected end.

6. The combination of claim 1 wherein a heat shield is mounted over said radially inner surface of said rim and said length of pressure relief tube is interposed between said heat shield and said radially inner surface.

7. The combination of claim 1 wherein said air pressure tube is one of at least three air pressure relief tubes located at circumferentially spaced positions around said rim and in communication with said air pressure chamber, whereby one of said tubes is positioned close to the top of said assembly where the highest temperatures are reached when the rotation of the assembly is stopped after braking.

8. The combination of claim 7 further comprising passages in said rim in communication between said pressure relief tubes and said air pressure chamber and at least one of said passages being in communication with an air inlet valve for transmitting inflation air to said air pressure chamber.

9. A tire rim thermal pressure relief assembly comprising an annular rim for mounting a tire, said rim having a radially inner surface and a radially outer surface on which said tire is mounted, an air pressure chamber within said tire, said rim containing a passage in communication with said air pressure chamber, an air pressure relief tube connected to said rim and in communication with said passage, said air pressure relief tube being disposed along said radially inner surface of said rim and extending in a direction generally axially of said rim for exposure to rim temperatures along the axial extent of said rim, said air pressure relief tube containing a plug of eutectic material located at a predetermined position along the length of said relief tube to maintain pressure in said air pressure chamber under normal temperatures and to melt and release said air pressure at temperatures above the melting point of said eutectic material, said air pressure relief tube having a free end and a connected end, said free end being releasably fastened to said rim at a position along the radially inner surface of said rim and said connected end being releasably connected to said rim adjacent said passage for communication of air between said passage and said tube, a heat shield mounted over said radially inner surface of said rim and said pressure relief tube being interposed between said heat shield and said radially inner surface.

* * * * *